Oct. 24, 1944.  H. MOLLY  2,361,046
METHOD OF MAKING HYDRAULICALLY OPERATING
GEARS OR TRANSMITTING DEVICES
Filed Nov. 1, 1938  2 Sheets-Sheet 1
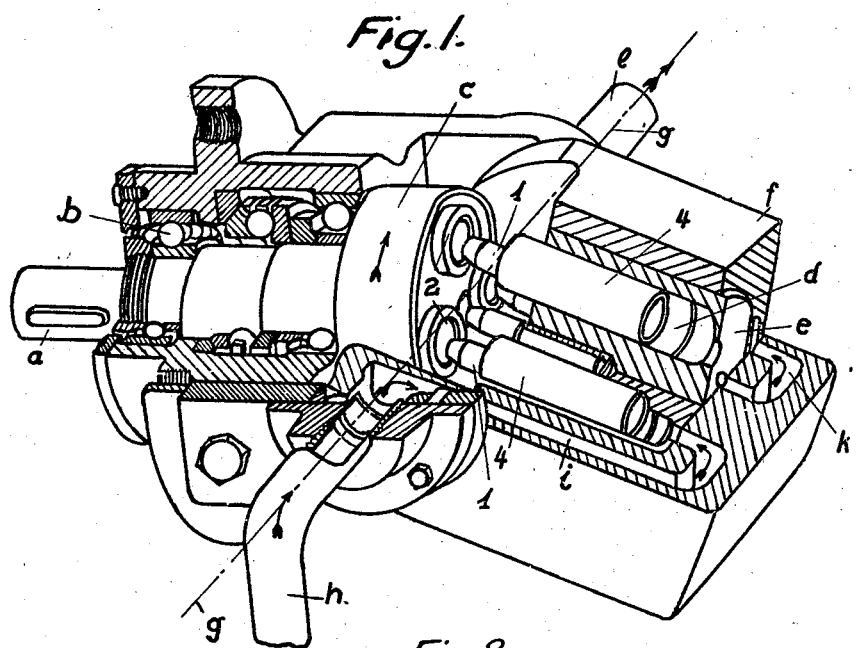
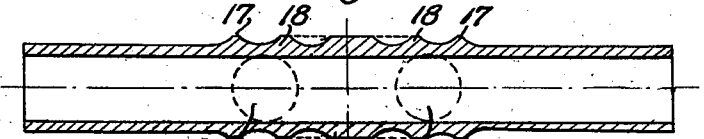
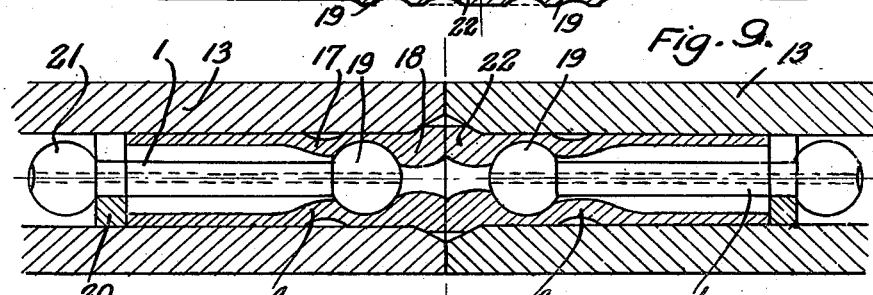
Inventor:
Hans Molly
By A. D. Adams
Attorney Oct. 24, 1944.   H. MOLLY   2,361,046
METHOD OF MAKING HYDRAULICALLY OPERATING
GEARS OR TRANSMITTING DEVICES
Filed Nov. 1, 1938   2 Sheets-Sheet 2
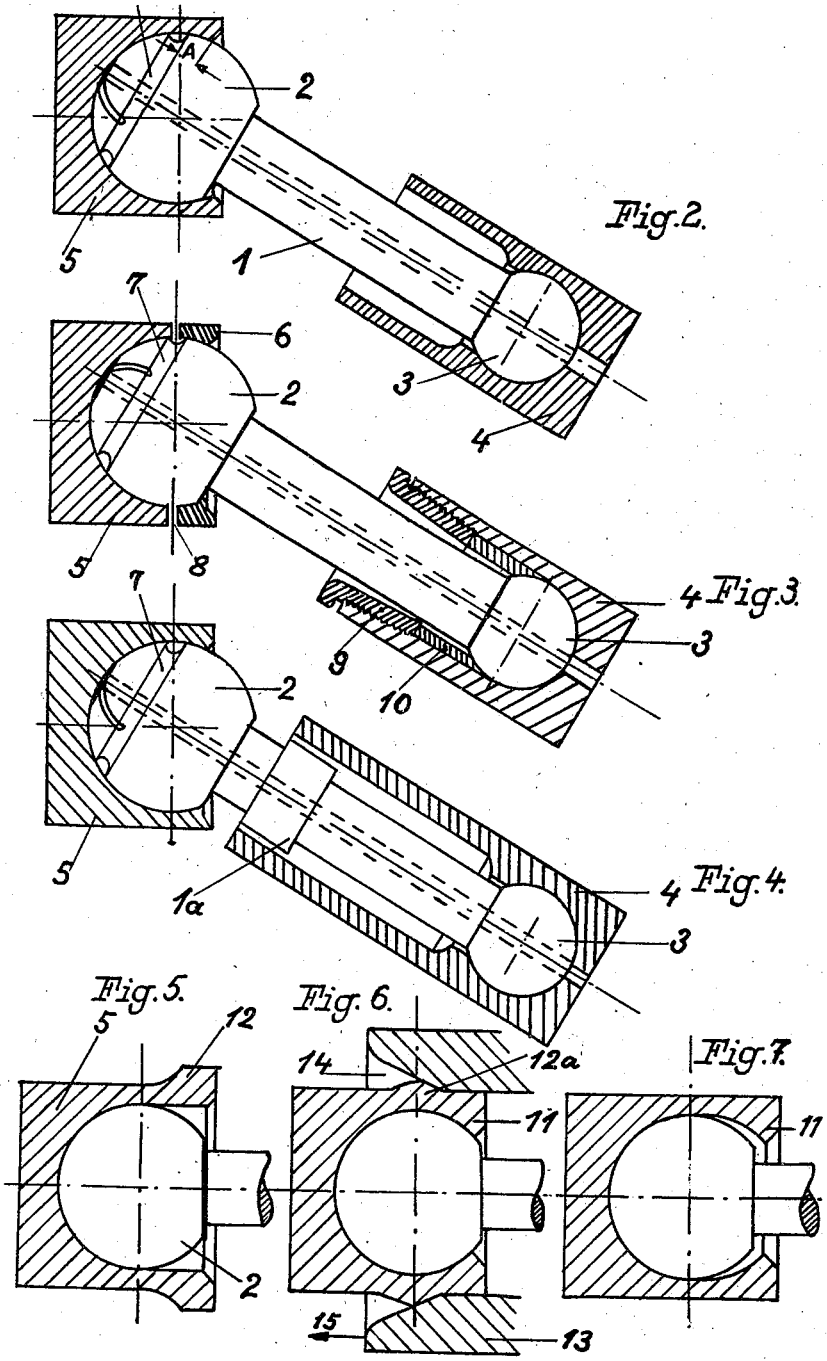
Inventor:
Hans Molly
By A. D. Adams
Attorney Patented Oct. 24, 1944

2,361,046

UNITED STATES PATENT OFFICE 2,361,046

METHOD OF MAKING HYDRAULICALLY OPERATING GEARS OR TRANSMITTING DEVICES

Hans Molly, Berlin-Tempelhof, Germany; vested in the Alien Property Custodian

Application November 1, 1938, Serial No. 238,270
In Germany June 29, 1937

1 Claim. (Cl. 148—12)

This invention relates to improvements in or relating to hydraulically operating gears or transmitting devices and more particularly to a ball cup for the piston rods of such gears having a ball head engaging said cup.

The primary object of the invention is to simplify the manufacture of such ball cups.

A further object of the invention is to remove the disadvantages of the well known cups, comprising two parts—a cup and a retaining disc for closing the cup after the insertion of the piston ball head.

In order to more fully explain the present invention and other aims and advantages thereof in the following description some manufacturing processes according to the invention are described with reference to the accompanying drawings in which Fig. 1 is a perspective view partly in section of a hydraulically operating transmission gear.

Fig. 2 is a section view of the piston ball head and the cup surrounding it, forming part of said gear.

Fig. 3 corresponds to Fig. 2 and shows the ball cup of the well known type.

Fig. 4 is a modification of the new construction according to Fig. 2.

Figs. 5, 6 and 7 diagrammatically illustrate the manufacturing process of the new ball cup.

Figs. 8 and 9 diagrammatically illustrate another manufacturing process according to the invention.

Referring now to Fig. 1, the well known hydraulically operating gears comprise a pump and a motor. The liquid delivered by the pump may be controlled in any convenient manner so as to control the transmission ratio between the driving shaft of the pump and the motor shaft driven by the liquid delivered by the pump.

Fig. 1 shows for illustrative purposes one embodiment of the pump. The shaft $a$ mounted in anti-friction bearings $b$ is provided with a driving disc $c$ to which the piston rods $i$ of a plurality of pistons $4$ are linked by means of balls $2$ formed at the end of the piston rod. Each piston $4$ is mounted in a cylindrical bore $d$ of a cylinder block $e$ rotatably mounted in a frame $f$ having a rocking axis $g$ for varying the inclination of the longitudinal axis of the cylinder block $e$ to the axis of the driving shaft $a$. In case the angle of inclination is zero, i. e., the axis of the cylinder block $e$ coincides with the axis of the driving shaft $a$, the pistons $4$ only rotate around the axis of the cylinder block $e$, but do not execute the usual reciprocating piston movement for delivering the transmitting liquid. However, as soon as the axis of the cylinder block $e$ is more or less inclined against the axis of the shaft $a$, the pistons $4$ reciprocate in their bores $d$, the stroke of the pistons being a function of the inclination angle as will be readily undertsood from Fig. 1 and as is well known.

In the position shown in Fig. 1 the liquid is sucked in through a pipe $h$ and a channel $i$ provided in the frame $f$, whilst another channel $k$ communicates with a pipe $e$ for leading the liquid delivered by the pistons to the motor not shown. This motor may be constructed in the same manner as the pump shown in Fig. 1 with the exception that the frame $f$, comprising the cylinder block $e$ may be fixedly mounted relative to the axis of the motor shaft so that the stroke volume of the motor cylinders remains constant and the speed of the motor or output shaft may be varied by varying the quantity of liquid delivered by the pump in the manner described with reference to Fig. 1.

The object of the invention is to improve the manufacturing process of the ball cups surrounding the piston ball head $2$. As shown in detailed manner in Fig. 2, the ball cup $5$ must surround more than half of the ball $2$ in order to be capable of imparting to the piston rod $i$ not only a thrust, but also a pull. Previously cups of semi-spherical shape have been used and a special retaining disc $8$ provided for closing the cup after the insertion of the piston ball head $2$.

The well known ball cups as shown in Fig. 3, comprising two parts have great disadvantages, particularly in case of small gears or transmitting devices. These disadvantages are due to the following reasons:

To provide for hydraulic relief, an annular groove $7$ provided in the ball $2$ must have substantially the diameter of the piston $4$, in which case it projects, as shown by Fig. 3 into the joint $8$ separating the cup $5$ and the retaining disc $6$. For this reason, it was previously necessary to do without a complete hydraulic relief of this kind and a temporary, partial relief had to suffice, if it were not desired to use other comparatively expensive and complicated relieving means. If, however, as in Fig. 2, the cup $5$ is formed in one piece, a complete hydraulic relief can be obtained through the annular groove $7$, since the annular space always remains within a closed spherical surface, and the distance A is sufficiently large to guard against an excessively abrupt drop in the oil pressure.

The advantage of the ball cup $5$ being in one piece also applies fundamentally to the ball cup furnished in the piston 4 for reception of the ball 3. This renders it unnecessary to guard against dislodging of the ball 3, after it has been inserted in the piston 4 by a special nut 9 and a bi-partite ring 10. These additional parts make the manufacture more difficult and expensive, in the case of small dimensions, to such an extent that it has already been proposed to dispense with the possibility of the suction by the piston 4 itself and to provide a special make-up pump which has the task of maintaining the piston 4 against its ball 3 during the suction stroke in the plant.

If the ball cup within the piston 4 is also made in one piece, this provides a possibility of a constructive, simple means for driving the cylinder block by the piston rod itself. Thus according to Fig. 4, the piston may be extended over practically the whole length of the rod 1 and the rod may be provided with a collar 1a which only leaves a small amount of play required for dynamical reasons, and therefore moves the piston 4 with the cylinder block during the oscillating movement.

Figs. 5 to 7 illustrate the manufacture of the integral cup. The cup is first of all of semi-spherical shape and has a cylindrical extended portion 11 and a thickened annular portion 12. After insertion of the ball 2 in the cup 5, a tube 13 with a frusto-conical shaped enlargement 14 is forced from the side on which the opening in the cup is located, that is to say in the direction of the arrow 15, over the cup. In this way the cylindrical projection is forced against the periphery of the ball and the cup is closed (Fig. 6). This pressure, which upsets the material against the periphery of the ball, provides a tight seating which is eased by a further operation. Thus the tube 13 is forced in the same direction and as a result of the thickened portion 12a of the material (Fig. 6) the material is compressed to the maximum diameter permitting the sliding thereover of the pipe, and is extended, so that the projection 11 which is upset against the periphery of the ball during the first operation is moved away from the ball to some extent as shown, greatly exaggerated, in Fig. 7. In this way the ball is given the desired easy movement in its cup.

The piston rod is formed fundamentally the same way.

The specific high pressures, which may occur in hydraulic mechanisms render it necessary to impart to the balls and ball cups the requisite hardness. The alloys which would be suitable when carrying out the method of manufacture according to the invention, are in general too soft. For this reason, it is advisable to choose the materials and to carry out the manufacture in the following fashion:

The piston rod 1 and the two balls 2 and 3 are made of nitro-steel, which has proved in practice to retain its hardness up to a temperature of about 500°. Beryllium bronze, which can be hardened at about a temperature of 300°, which temperature has no influence on the hardness of the nitro-steel balls which have already been inserted, is used for making the ball cups. In this connection, it is important that the beryllium bronze is so soft before the hardening process, that the integral formation by the process according to the present invention occasions no difficulties.

According to a modification of the invention the inventive process may be further improved by employing a tubular blank as shown in Figs. 8 and 9.

This tube 16 has approximately twice the length of the piston to be made and the same wall thickness as this piston. This tube can be turned before the deformation. The tube is provided at its central portion with the collar-like raised portions 17 and 18 which serve for producing the ball socket by deformation. These are located on both sides of the ball 19 which is to be inserted in the tube before the deformation. For reasons which are explained hereinafter, the balls 19 are brought beyond the position corresponding to the exact mean position of the ball between the two collars 17 and 18. As described with reference to Figs. 5 to 7, a tool 13 is then moved over the tube 16 from each of the two ends of the tube, and thereby each of the collars 17 and 18 are pressed inwardly with deformation of the material of the tube, so that at the end of the deforming process, the shape indicated in Fig. 9 is obtained.

The following special conditions apply on account of the fact that two pistons are here simultaneously formed from a blank. Immediately the tool 13 is pushed over the blank, it acts on the outer collar 17 and presses this inwardly, and under this pressure the ball 19 would yield and draw the piston rod 1 inwards, that is to say, would undesirably effect the correct position of the ball in relation to the collars 17 and 18. To avoid this, a collar 20 is pushed over the piston rod 1 before the application of the tool 13, which collar bears on the one side against the outer end of the tube 16 and on the other side against the outer ball 21. This retains the piston rod 1 in the correct position against the traction exerted on the ball during the deformation and can be withdrawn after the tool 13 is removed. To this end it is provided with a lateral opening.

Upon the further moving of the tool 13 over the second collar 18, this presses on the ball 19 in such a way as to relieve the collar 20 so that the latter can be withdrawn without effort after the deformation. If the ball 19 were to lie exactly symmetrically between the two collars 17 and 18 during the deformation, the forcing of the collar 20 caused by the deformation of the first collar 17 would not be sufficiently compensated by the deformation of the second collar 18 to enable the collar 20 to be withdrawn without being expanded. Moreover there is the danger in this instance that the piston rod 1 would undergo excessive strain due to the tractive forces.

Basically, the two collars 18 could be combined to form a single collar extending over the central portion of the tube (as indicated in dotted lines in Fig. 8). However, in order to make as little work in deformation as possible, it is advisable to separate the two collars from one another, and to furnish yet another collar 22 between the two collars, this further collar being advantageously wider or thicker than the collars 17 and 18. In this way the result is achieved that the end position of the tool 13 illustrated in Fig. 9 is symmetrical with respect to the two pistons to be made, whereas otherwise, the end position as regards the desired symmetry is not safeguarded.

After withdrawing the tool 13 and the collar 20, the two pistons which are still connected together can first of all be turned. During this process, in each case, one of the pistons can serve for the clamping. In the last operation, the two pistons are separated one from the other at the central part.

The manufacturing process according to Fig. 8 and 9 has the advantage of the process according to Figs. 5 to 7 that after the deformation the piston 4 has only to be turned from the exterior, i. e., a working of the piston from inside is dispensed with. Moreover, by manufacturing two pistons from one blank not only a special projection on the blank for chucking (for the subsequent turning) is saved, but the chucking is simplified.

Obviously, the present invention is not restricted to the particular embodiments herein shown and described. Many modifications from these embodiments may be made without departing from the spirit of the invention as defined in the appended claim.

What is claimed is:

In the process of manufacturing the ball joint for the piston rod of a hydraulically operating transmitting device of the kind described having the piston rod integral with the ball, the steps comprising producing the ball for said joint from steel adapted to be hardened by a nitrating process, hardening said ball by thermal treatment, producing the ball cup for said joint from beryllium bronze, said nitro-steel ball retaining its hardness up to a temperature of about 500° C., inserting said ball into said beryllium bronze cup, upsetting the metal of said cup over said ball so as to close said cup and hardening said closed cup enclosing said ball by heating it up to a temperature of about 300° C.

HANS MOLLY.